(12) United States Patent
Kusaka et al.

(10) Patent No.: US 12,242,079 B2
(45) Date of Patent: Mar. 4, 2025

(54) LIGHT DIFFRACTION ELEMENT AND OPTICAL COMPUTING SYSTEM

(71) Applicant: FUJIKURA LTD., Tokyo (JP)

(72) Inventors: Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 492 days.

(21) Appl. No.: 17/635,483

(22) PCT Filed: Jun. 17, 2021

(86) PCT No.: PCT/JP2021/022976
§ 371 (c)(1),
(2) Date: Feb. 15, 2022

(87) PCT Pub. No.: WO2022/049864
PCT Pub. Date: Mar. 10, 2022

(65) Prior Publication Data
US 2022/0269100 A1      Aug. 25, 2022

(30) Foreign Application Priority Data

Sep. 7, 2020    (JP) .................. 2020-149859

(51) Int. Cl.
  *G02B 27/28*    (2006.01)
  *G02B 5/18*     (2006.01)
  *G02B 5/30*     (2006.01)

(52) U.S. Cl.
  CPC ......... *G02B 27/286* (2013.01); *G02B 5/1814* (2013.01); *G02B 5/3025* (2013.01); *G02B 27/283* (2013.01)

(58) Field of Classification Search
  CPC .... G02F 1/133528; G02F 1/1335; G02F 3/00; G02B 5/30; G02B 5/3083; G02B 27/286;
  (Continued)

(56) References Cited

U.S. PATENT DOCUMENTS 5,245,471 A     9/1993  Iwatsuka et al.
6,278,548 B1 *  8/2001  Shimano .............. G02B 5/1866
(Continued)

FOREIGN PATENT DOCUMENTS

CN    104779580 A    7/2015
CN    105068357 A    11/2015
(Continued)

OTHER PUBLICATIONS

International Search Report issued in corresponding International Application No. PCT/JP2021/022976 mailed Aug. 10, 2021 (2 pages).

(Continued)

*Primary Examiner* — Darryl J Collins
*Assistant Examiner* — Matthew Y Lee
(74) *Attorney, Agent, or Firm* — Osha Bergman Watanabe & Burton LLP

(57) ABSTRACT

A light diffraction element, that has cells, includes first regions and second regions. Each of the cells comprises one of the first regions and one of the second regions. Each of the first regions has a thickness or a refractive index that is independently set. The second regions have a uniform thickness or a uniform refractive index. The first regions allow first polarized components of signal light to pass through. The second regions allow second polarized components of signal light to pass through. The second polarized components are different, in polarization direction, from the first polarized components. The light diffraction element performs optical computing by causing the first polarized components of signal light that have passed through the first regions to interfere with each other. The first polarized components of signal light output from the light diffraction element indicate information after the optical computing.

6 Claims, 2 Drawing Sheets

(58) Field of Classification Search
CPC .... G02B 27/28; G02B 27/288; G02B 27/285; G02B 27/283; G02B 5/1814; G02B 5/3025; G02B 27/4261; G02B 27/4277; G02B 27/44; G02B 5/18
See application file for complete search history.

(56) References Cited

U.S. PATENT DOCUMENTS

| | | | |
|---|---|---|---|
| 6,426,837 B1* | 7/2002 | Clark | G02B 27/4261 |
| | | | 359/489.08 |
| 7,847,225 B2 | 12/2010 | Yokoyama | |
| 2006/0028957 A1* | 2/2006 | Kim | G03F 7/70125 |
| | | | 369/110.01 |
| 2006/0050391 A1 | 3/2006 | Backlund et al. | |
| 2006/0193235 A1* | 8/2006 | Murata | G02B 5/3016 |
| 2006/0239171 A1* | 10/2006 | Ooi | G11B 7/1275 |
| 2007/0109643 A1 | 5/2007 | Lee et al. | |
| 2010/0176278 A1 | 7/2010 | Yokoyama | |
| 2014/0071394 A1* | 3/2014 | Umezawa | G02B 5/30 |
| | | | 427/532 |
| 2021/0048569 A1* | 2/2021 | Rubin | G01J 4/04 |

FOREIGN PATENT DOCUMENTS

| | | |
|---|---|---|
| JP | H02-063027 A | 3/1990 |
| JP | 2007141295 A | 6/2007 |
| JP | 2007-538266 A | 12/2007 |
| JP | 5173309 B2 | 4/2013 |
| WO | 2009/133592 A1 | 11/2009 |
| WO | 2019/147828 A1 | 8/2019 |
| WO | 2019/200289 A1 | 10/2019 |

OTHER PUBLICATIONS

Written Opinion issued in corresponding International Application No. PCT/JP2021/022976 mailed Aug. 10, 2021 (3 pages).
English translation of International Preliminary Report on Patentability issued in corresponding International Application No. PCT/JP2021/022976 dated Mar. 7, 2023 (4 pages).

* cited by examiner

LIGHT DIFFRACTION ELEMENT AND OPTICAL COMPUTING SYSTEM

TECHNICAL FIELD

The present invention relates to a light diffraction element which carries out optical computing. Moreover, the present invention relates to an optical computing system which includes such a light diffraction element.

BACKGROUND

A light diffraction element is known that includes a plurality of microcells each of which has an individually set refractive index. This light diffraction element is designed such that light beams which have passed through the microcells are caused to interfere with each other to optically carry out predetermined computing. The optical computing using the light diffraction element can be carried out at a higher speed and low power consumption, as compared with electrical computing using a processor. Patent Literature 1 discloses an optical neural network having an input layer, an intermediate layer, and an output layer. The above light diffraction element can be utilized as, for example, an intermediate layer for such an optical neural network.

CITATION LIST

Patent Literature

[Patent Literature 1]
Specification of U.S. Pat. No. 7,847,225

SUMMARY

In computing, it is sometimes necessary to refer to both information before the computing and information after the computing. As an example of such computing, in a defect extraction operation for extracting a defect of a subject in an image, an image before the operation is synthesized with an image after the operation, and thus an image can be obtained in which a checker can easily visually identify a type and a location of a defect in the subject. However, output light from a conventional light diffraction element includes only signal light after the computing, and does not include signal light before the computing. Therefore, the conventional light diffraction element is not suitable for computing that needs to refer to both information before the computing and information after the computing.

One or more embodiments of the present invention provide a light diffraction element which can output signal light indicative of information before the computing, in addition to signal light indicative of information after the computing.

The light diffraction element in accordance with one or more embodiments of the present invention is a light diffraction element constituted by a plurality of cells. In the light diffraction element in accordance with one or more embodiments of the present invention, first regions of respective of the plurality of cells allow first polarized components to pass through and have respective thicknesses or refractive indices that are independently set; and second regions of respective of the plurality of cells allow second polarized components to pass through and have uniform thicknesses or uniform refractive indices, the second polarized components being different in polarization direction from the first polarized components.

The optical computing system in accordance with one or more embodiments of the present invention includes: the light diffraction element; a light-emitting device that outputs signal light to be input to the light diffraction element; and a light-receiving device that detects, without distinction, the first polarized components and the second polarized components of signal light which is output from the light diffraction element.

The optical computing system in accordance with one or more embodiments of the present invention includes: the light diffraction element; a light-emitting device that outputs signal light to be input to the light diffraction element; a first light-receiving device that detects the first polarized components of signal light output from the light diffraction element; and a second light-receiving device that detects the second polarized components of the signal light output from the light diffraction element.

According to one or more embodiments of the present invention, it is possible to provide a light diffraction element which can output signal light indicative of information before the computing, in addition to signal light indicative of information after the computing. Moreover, according to one or more embodiments of the present invention, it is possible to provide an optical computing system which includes such a light diffraction element.

DETAILED DESCRIPTION

Configuration of Light Diffraction Element

Figure 1:
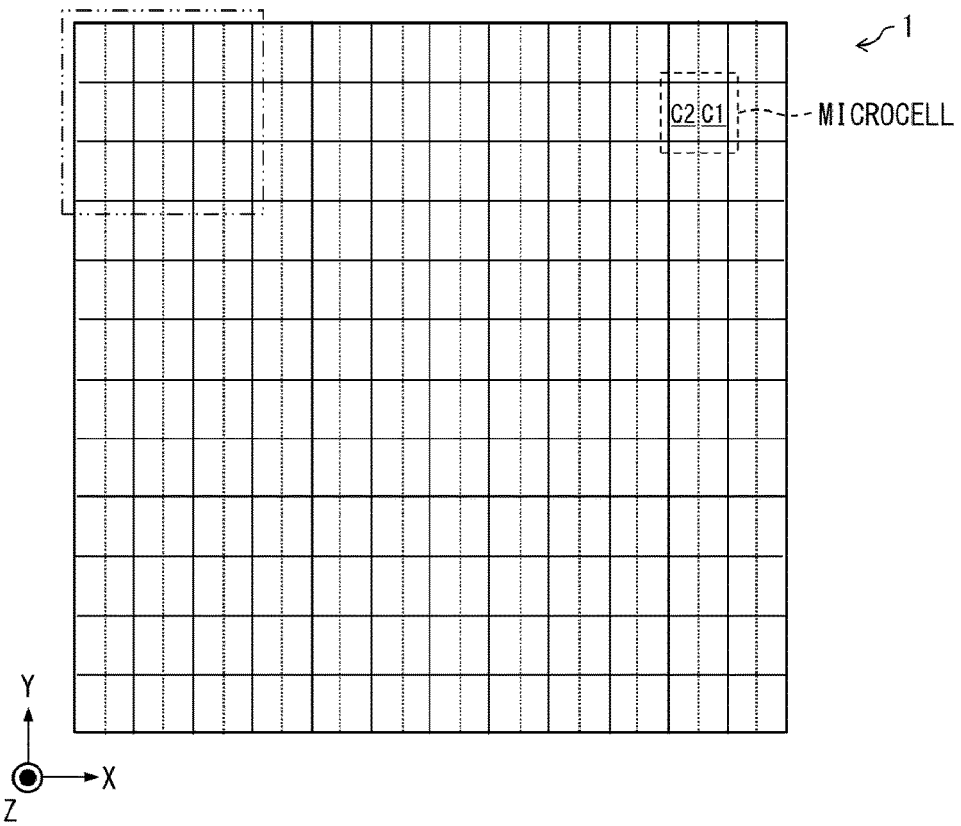
FIG. 1 is a plan view illustrating a configuration of a light diffraction element in accordance with one or more embodiments of the present invention.
Figure 2:
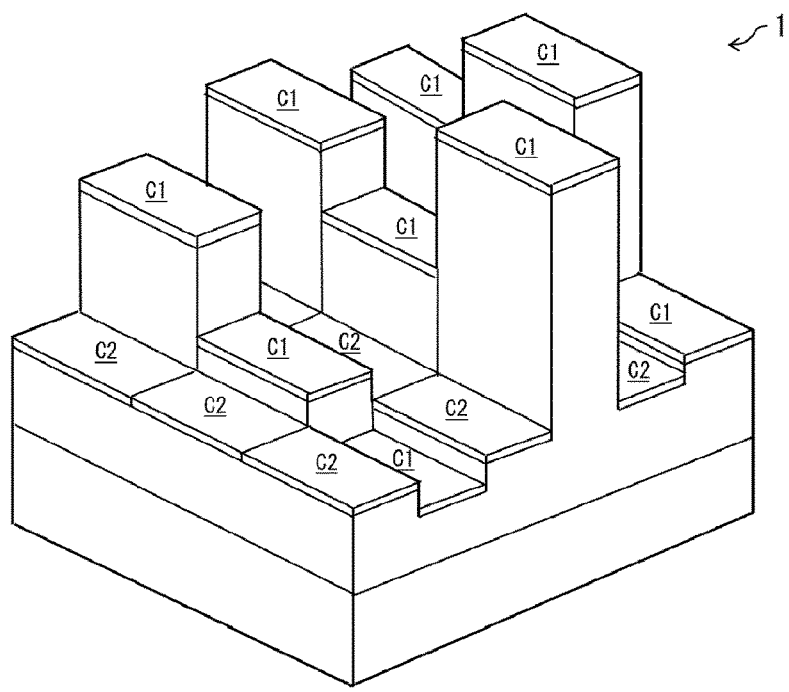
FIG. 2 is a perspective view illustrating a partially magnified portion of the light diffraction element illustrated in FIG. 1.

The following description will discuss a configuration of a light diffraction element 1 in accordance with one or more embodiments of the present invention with reference to FIG. 1 and FIG. 2. FIG. 1 is a plan view illustrating the light diffraction element 1. FIG. 2 is a perspective view in which a part (surrounded by the dashed lines in FIG. 1) of the light diffraction element 1 is magnified.

The light diffraction element 1 is a planar light diffraction element and is constituted by a plurality of microcells (an example of "cell" in claims). Here, the term "microcell" refers to, for example, a cell having a cell size of less than 10 μm. The term "cell size" refers to a square root of an area of a cell. For example, when a shape of a microcell in a plan view is a square shape, the cell size is a length of one side of the cell. A lower limit of the cell size is not particularly limited and can be, for example, 1 nm.

The light diffraction element 1 illustrated in FIG. 1 is constituted by 12×12 microcells which are arranged in a matrix manner. A shape of each of the microcells in a plan view is a square shape having a size of 1 μm×1 μm, and a shape of the light diffraction element 1 in a plan view is a square shape having a size of 12 μm×12 μm.

Each of the microcells includes a first region C1 which selectively allows a first polarized component contained in signal light to pass through, and a second region C2 which selectively allows a second polarized component contained in the signal light to pass through. In the microcells, thicknesses or refractive indices of the respective first regions C1 are independently set. According to the configuration, phase change amounts of the first polarized components passing through the microcells are independently set. Meanwhile, the second regions C2 in the respective microcells are set to have uniform thicknesses or uniform refractive indices. According to the configuration, phase conversion amounts of the second polarized components passing through the microcells are uniformly set. Therefore, the light diffraction element 1 selectively acts on the first polarized components of signal light. That is, the light diffraction element 1 causes only the first polarized components of signal light, which have passed through the microcells, to interfere with each other to carry out (i.e., perform) predetermined optical computing. Therefore, the first polarized components of an optical signal output from the light diffraction element 1 become an optical signal indicative of information after the computing, while the second polarized components of signal light output from the light diffraction element 1 become an optical signal indicative of information before the computing. Here, "selectively allowing the first polarized components to pass through" and "selectively acting on the first polarized components" mean, in other words, that "a transmittance of the first polarized components is higher than a transmittance of the second polarized components". Moreover, "selectively allowing the second polarized components to pass through" means, in other words, that "a transmittance of the second polarized components is higher than a transmittance of the first polarized components".

Note that the first polarized components (on which the light diffraction element 1 acts) only need to be polarized components having the polarization direction different from that of the second polarized components (on which the light diffraction element 1 does not act). For example, it is possible to set X polarized light (which is linear polarized light whose polarization plane is parallel to a Z-X plane) is set as the first polarized component, and Y polarized light (which is linear polarized light whose polarization plane is parallel to a Y-Z plane) is set as the second polarized component. Alternatively, it is possible that right circular polarized light is set as the first polarized component, and left circular polarized light is set as the second polarized component. In one or more embodiments, as the light diffraction element 1, a light diffraction element in the former form, i.e., the light diffraction element 1 which selectively acts on X polarized light is employed. In other words, the light diffraction element 1 in which the transmittance of X polarized light is higher than the transmittance of Y polarized light is employed.

Each of the first regions C1 and the second regions C2 in the microcells of the light diffraction element 1 which selectively acts on X polarized light can be constituted by, for example, a pillar that has an emission surface on which a polarizing filter is provided (see FIG. 2). The polarizing filter that is provided on the emission surface of the pillar constituting the first region C1 is a polarizing filter which selectively allows X polarized light to pass through (i.e., the transmittance of X polarized light is higher than the transmittance of Y polarized light). The polarizing filter that is provided on the emission surface of the pillar constituting the second region C2 is a polarizing filter which selectively allows Y polarized light to pass through (i.e., the transmittance of Y polarized light is higher than the transmittance of X polarized light). This makes it possible to set the phase change amount with respect to X polarized light of each microcell in accordance with the height of the pillar, while setting the phase change amounts with respect to Y polarized light of the microcells to be uniform. That is, it is possible to provide the light diffraction element 1 which selectively acts on X polarized light. Note that, as the polarizing filter, it is possible to use, for example, a metasurface. The polarizing filter can be provided on an incidence surface of each pillar instead of being provided on the emission surface of each pillar, or can be provided on both the incidence surface and the emission surface of each pillar.

The thickness or refractive index of the first region C1 of each of the microcells can be set, for example, by using machine learning. A model that is used in the machine learning can be, for example, a model to which an intensity distribution of signal light input to the light diffraction element 1 is input, and from which an intensity distribution of the first polarized components of signal light output from the light diffraction element 1 is output. Furthermore, the model contains thicknesses or refractive indices of the first regions C1 of the microcells as parameters.

[First Optical Computing System]

Figure 3:
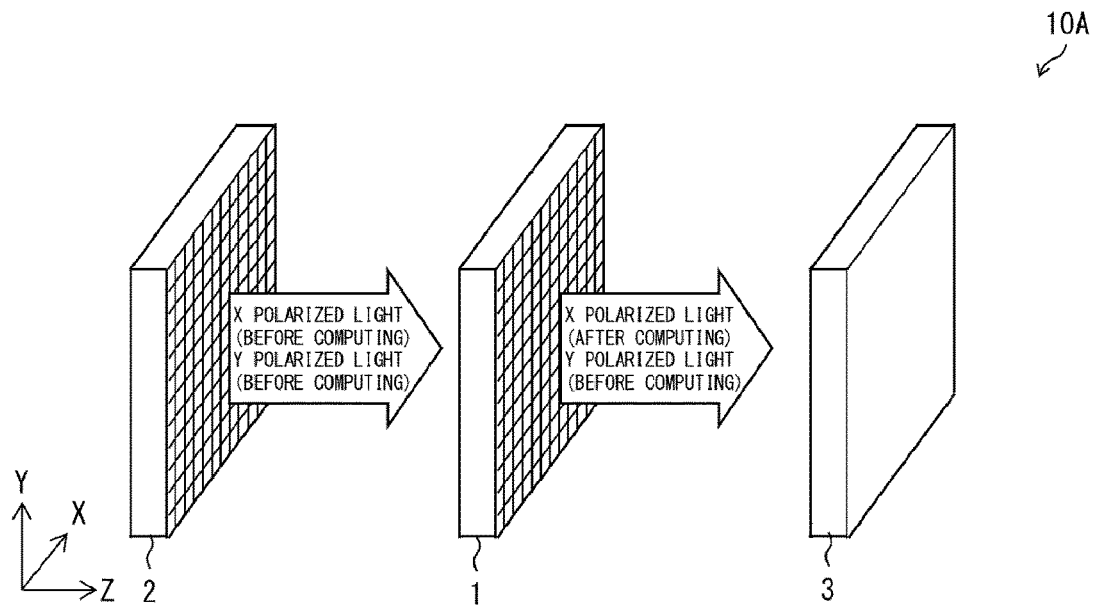
FIG. 3 is a perspective view illustrating a main part configuration of a first optical computing system including the light diffraction element illustrated in FIG. 1.

With use of the light diffraction element 1, it is possible to optically perform computing for deriving a sum signal of a signal before the computing and a signal after the computing. FIG. 3 is a perspective view illustrating a main part configuration of an optical computing system 10A for carrying out such optical computing.

The optical computing system 10A includes a light-emitting device 2 and a light-receiving device 3, in addition to the light diffraction element 1.

The light-emitting device 2 is a device for emitting signal light that is to be input to the light diffraction element 1. The light-emitting device 2 has a plurality of cells which are arranged in a matrix manner and is constituted by, for example, a two-dimensional display. The cells in the light-emitting device 2 correspond to respective microcells of the light diffraction element 1 (i.e., one-to-one correspondence). Light output from each of the cells of the light-emitting device 2 includes the first polarized component and the second polarized component, and is input to a corresponding microcell of the light diffraction element 1. In one or more embodiments, a traveling direction of signal light is a positive Z axis direction, the first polarized component is an X polarized component, and the second polarized component is a Y polarized component.

The light-receiving device 3 is a device for detecting signal light that has been output from the light diffraction element 1. The light-receiving device 3 has a plurality of cells which are arranged in a matrix manner and is constituted by, for example, a two-dimensional image sensor. The cells in the light-receiving device 3 correspond to respective microcells of the light diffraction element 1 (i.e., one-to-one correspondence). An X polarized component of signal light which has passed through each of the microcells of the light diffraction element 1 interferes with X polarized components of signal light which have passed through the other microcells of the light diffraction element 1, and is input to each of the cells of the light-receiving device 3. Meanwhile, a Y polarized component of signal light which has passed through each of the microcells of the light diffraction element 1 does not interfere with Y polarized components of signal light which have passed through the other microcells of the light diffraction element 1, and is input to a cell of the light-receiving device 3 corresponding to that microcell. The cells of the light-receiving device 3 detect signal light output from the light diffraction element 1 without distinguishing between the X polarized components and the Y polarized components. Therefore, signal light detected by the light-receiving device 3 indicates a sum signal of a signal before the computing and a signal after the computing.

As described above, according to the optical computing system 10A, it is possible to achieve, with use of the light diffraction element 1, optical computing for deriving a sum signal of a signal before the computing and a signal after the computing. As an example, the optical computing system 10A can be suitably used for a defect extraction operation for extracting a defect of a subject from an image. In this case, when an original image is displayed on the light-emitting device 2 which is a display device, the light-receiving device 3 which is an image sensor can detect a synthetic image in which a defect image including only a defect extracted from the original image as a subject is superimposed on the original image.

In one or more embodiments, the configuration is employed in which one light diffraction element 1 is provided on an optical path of light output from the light-emitting device 2, and light which has passed through the light diffraction element 1 is input to the light-receiving device 3. Note, however, that the present invention is not limited to this configuration. For example, it is possible to employ a configuration in which a plurality of light diffraction elements are provided on an optical path of light output from the light-emitting device 2, and light which has passed through the light diffraction elements is input to the light-receiving device 3. With the configuration, it is possible to provide the optical computing system 10A which can sequentially carry out a plurality of types of optical computing. In this case, the light diffraction element 1 which selectively acts on X polarized light only needs to be included in the plurality of light diffraction elements as at least one of the light diffraction elements.

[Second Optical Computing System]

Figure 4:
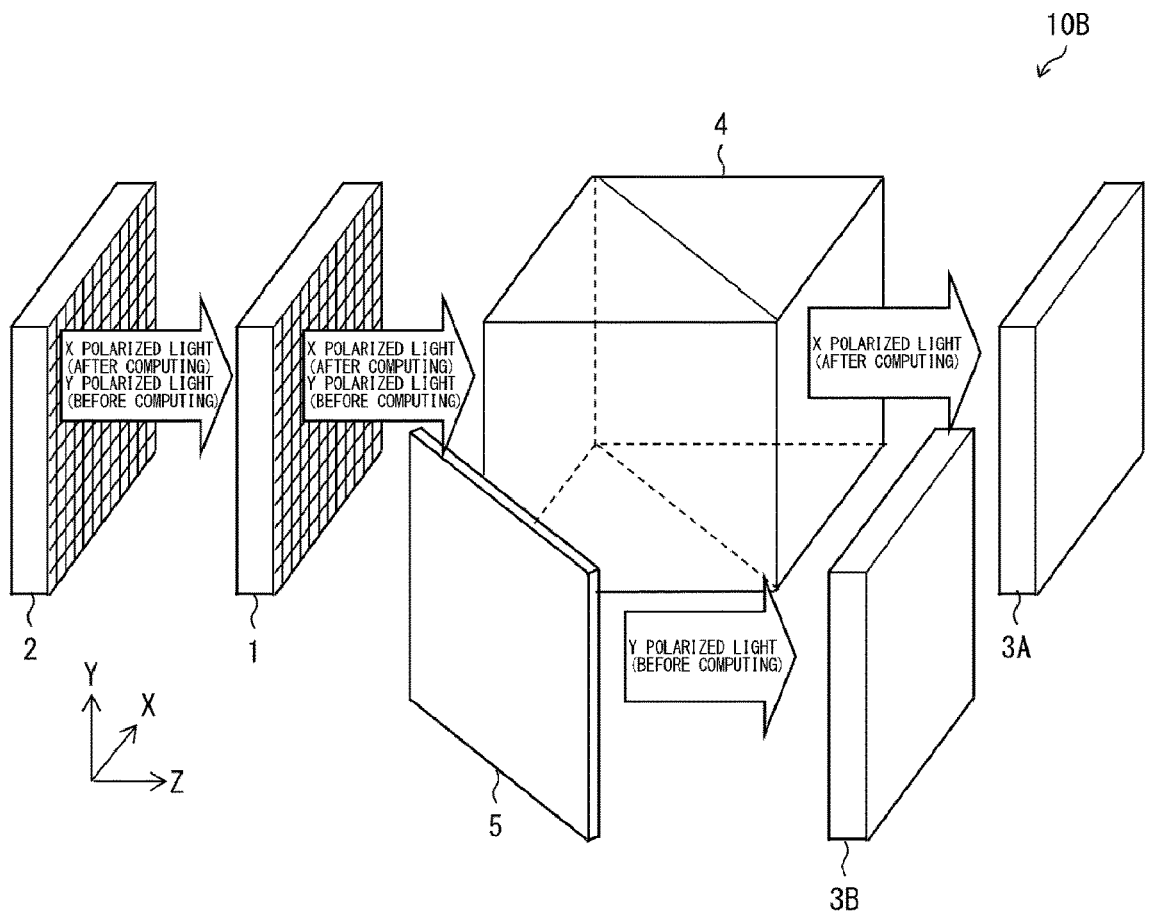
FIG. 4 is a perspective view illustrating a main part configuration of a second optical computing system including the light diffraction element illustrated in FIG. 1.

With use of the light diffraction element 1, it is possible to optically perform a plurality of types of optical computing for deriving a signal before the computing and a signal after the computing, respectively. FIG. 4 is a perspective view illustrating a main part configuration of an optical computing system 10B for carrying out such a plurality of types of optical computing.

The optical computing system 10B includes a light-emitting device 2, light-receiving devices 3a and 3b, a polarized beam splitter 4, and a mirror 5, in addition to the light diffraction element 1.

The light-emitting device 2 is identical with the light-emitting device 2 provided in the optical computing system 10A. The light-emitting device 2 has a plurality of cells which are arranged in a matrix manner and is constituted by, for example, a two-dimensional display. The cells in the light-emitting device 2 correspond to respective microcells of the light diffraction element 1 (i.e., one-to-one correspondence). Light output from each of the cells of the light-emitting device 2 includes the first polarized component and the second polarized component, and is input to a corresponding microcell of the light diffraction element 1. In one or more embodiments, a traveling direction of signal light is a positive Z axis direction, the first polarized component is an X polarized component, and the second polarized component is a Y polarized component.

The polarized beam splitter 4 is an optical element which allows the X polarized components of signal light output from the light diffraction element 1 to pass through, and reflects the Y polarized components of the signal light output from the light diffraction element 1. The X polarized components of signal light which have passed through the polarized beam splitter 4 are input to the light-receiving device 3a. The Y polarized components of signal light which have been reflected by the polarized beam splitter 4 are further reflected by the mirror 5 and are then input to the light-receiving device 3b.

The light-receiving device 3a is a device for detecting the X polarized components of signal light which have been passed through the polarized beam splitter 4. The light-receiving device 3a has a plurality of cells which are arranged in a matrix manner and is constituted by, for example, a two-dimensional image sensor. The cells in the light-receiving device 3a correspond to respective microcells of the light diffraction element 1 (i.e., one-to-one correspondence). An X polarized component of signal light which has passed through each of the microcells of the light diffraction element 1 interferes with X polarized components of signal light which have passed through the other microcells of the light diffraction element 1, and is input to each of the cells of the light-receiving device 3. The signal light detected by the light-receiving device 3a indicates a signal after the computing.

The light-receiving device 3b is a device for detecting the Y polarized components of signal light which have been reflected by the polarized beam splitter 4. The light-receiving device 3b has a plurality of cells which are arranged in a matrix manner and is constituted by, for example, a two-dimensional image sensor. The cells in the light-receiving device 3a correspond to respective microcells of the light diffraction element 1 (i.e., one-to-one correspondence). A Y polarized component of signal light which has passed through each of the microcells of the light diffraction element 1 does not interfere with Y polarized components of signal light which have passed through the other microcells of the light diffraction element 1, and is input to a cell of the light-receiving device 3 corresponding to that microcell. The signal light detected by the light-receiving device 3b indicates a signal before the computing.

As described above, according to the optical computing system 10B, it is possible to achieve, with use of the light diffraction element 1, a plurality of types of optical computing for deriving a signal before the computing and a signal after the computing, respectively. As an example, the optical computing system 10B can be suitably used for a defect extraction operation for extracting a defect of a subject from an image. In this case, when an original image is displayed on the light-emitting device 2 which is a display device, the light-receiving device 3a which is an image sensor can detect a defect image including only a defect extracted from the original image as a subject, and the light-receiving device 3b which is an image sensor can detect the original image.

In one or more embodiments, the configuration is employed in which one light diffraction element 1 is provided on an optical path of light output from the light-emitting device 2, and light which has passed through the light diffraction element 1 is input to the polarized beam splitter 4. Note, however, that the present invention is not limited to this configuration. For example, it is possible to employ a configuration in which a plurality of light diffraction elements are provided on an optical path of light output from the light-emitting device 2, and light which has passed through the light diffraction elements is input to the polarized beam splitter 4. With the configuration, it is possible to provide the optical computing system 10B which can sequentially carry out a plurality of types of optical computing. In this case, the light diffraction element 1 which selectively acts on X polarized light only needs to be included in the plurality of light diffraction elements as at least one of the light diffraction elements.

Embodiments of the present invention can also be expressed as follows:

The light diffraction element in accordance with one or more embodiments of the present invention is a light diffraction element constituted by a plurality of cells. In the light diffraction element in accordance with one or more embodiments of the present invention, first regions of respective of the plurality of cells allow first polarized components to pass through and have respective thicknesses or refractive indices that are independently set; and second regions of respective of the plurality of cells allow second polarized components to pass through and have uniform thicknesses or uniform refractive indices, the second polarized components being different in polarization direction from the first polarized components.

According to the configuration, it is possible to provide the light diffraction element which can output signal light indicative of information after the computing as the first polarized component, and output information before the computing as the second polarized component.

The light diffraction element in accordance with one or more embodiments of the present invention may additionally employ a configuration in which: the first polarized components of signal light which have passed through the first regions of respective of the plurality of cells are caused to interfere with each other so as to carry out predetermined computing; the first polarized components of signal light output from the light diffraction element indicate information after the computing; and the second polarized components of signal light output from the light diffraction element indicate information before the optical computing.

According to the configuration, it is possible to provide the light diffraction element which can output signal light indicative of information after the computing as the first polarized component, and output information before the computing as the second polarized component.

The light diffraction element in accordance with one or more embodiments of the present invention may additionally employ a configuration in which: the first region of each of the plurality of cells is constituted by a pillar having a height that is independently set; and a polarizing filter which selectively allows the first polarized components to pass through is provided on an emission surface or an incidence surface of the pillar.

According to the configuration, it is possible to easily produce the light diffraction element which can output signal light indicative of information after the computing as the first polarized component, and output information before the computing as the second polarized component.

An optical computing system in accordance with one or more embodiments of the present invention may additionally include: a light-emitting device that outputs signal light to be input to the light diffraction element; and a light-receiving device that detects, without distinction, the first polarized components and the second polarized components of signal light which is output from the light diffraction element.

According to the configuration, it is possible to optically perform computing for deriving a sum signal of a signal before the computing and a signal after the computing. As an example, it is possible to optically perform computing for deriving a synthetic image containing an image before the computing and an image after the computing.

The optical computing system in accordance with one or more embodiments of the present invention may additionally include a light-emitting device that outputs signal light to be input to the light diffraction element; a first light-receiving device that detects the first polarized components of signal light output from the light diffraction element: and a second light-receiving device that detects the second polarized components of the signal light output from the light diffraction element.

According to the configuration, it is possible to optically perform a plurality of types of computing for deriving a signal before the computing and a signal after the computing, respectively. As an example, it is possible to optically perform a plurality of types of computing for deriving an image before the computing and an image after the computing, respectively.

Note that the "light diffraction element" in this specification is an element for converting an optical signal indicative of certain information (for example, a certain image) into an optical signal indicative of other information (for example, another image). Therefore, the "light diffraction element" in this specification can alternatively be referred to as "optical filter", as in a case in which an element for converting an electrical signal indicative of a certain image into an electrical signal indicative of another image is called "filter". The "optical computing system" in this specification carries out optical computing with use of a light diffraction element, that is, an optical filter.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Light diffraction element
10A, 10B: Optical computing system
2: Light-emitting device
3: Light-receiving device
4: Polarized beam splitter
5: Mirror

The invention claimed is:
1. A light diffraction element having cells, the light diffraction element comprising:
first regions; and
second regions, wherein
each of the cells comprises one of the first regions and one of the second regions,
each of the first regions has an independently set thickness or an independently set refractive index,
the second regions have a uniform thickness or a uniform refractive index,
the first regions allow first polarized components of signal light to pass through,
the second regions allow second polarized components of signal light to pass through,
the second polarized components are different, in polarization direction, from the first polarized components,
the light diffraction element performs optical computing by causing the first polarized components of signal light that have passed through the first regions to interfere with each other, the first polarized components of signal light output from the light diffraction element indicate information after the optical computing, and the second polarized components of signal light output from the light diffraction element indicate information before the optical computing.

2. The light diffraction element as set forth in claim 1, wherein:

each of the first regions comprises a pillar having an independently set height, and a polarizing filter, that selectively allows the first polarized components to pass through, is disposed on an emission surface or an incidence surface of the pillar.

3. An optical computing system comprising the light diffraction element according to claim 1, further comprising:

a light-emitting device that outputs signal light to the light diffraction element; and a light-receiving device that detects, without distinction between polarization components, the first polarized components and the second polarized components of signal light output from the light diffraction element.

4. An optical computing system comprising the light diffraction element according to claim 1, further comprising:

a light-emitting device that outputs signal light to the light diffraction element;

a first light-receiving device that detects the first polarized components of signal light output from the light diffraction element; and a second light-receiving device that detects the second polarized components of the signal light output from the light diffraction element.

5. The light diffraction element as set forth in claim 1, wherein at least one of the first regions has a different thickness than any of the other first regions.

6. The light diffraction element as set forth in claim 1, wherein at least one of the first regions has a different refractive index than any of the other first regions.

* * * * *